Jan. 3, 1933.  P. G. WILLETTS  1,893,314
MEANS FOR PRODUCING FIRED CERAMIC BLOCKS
Filed Sept. 20, 1929
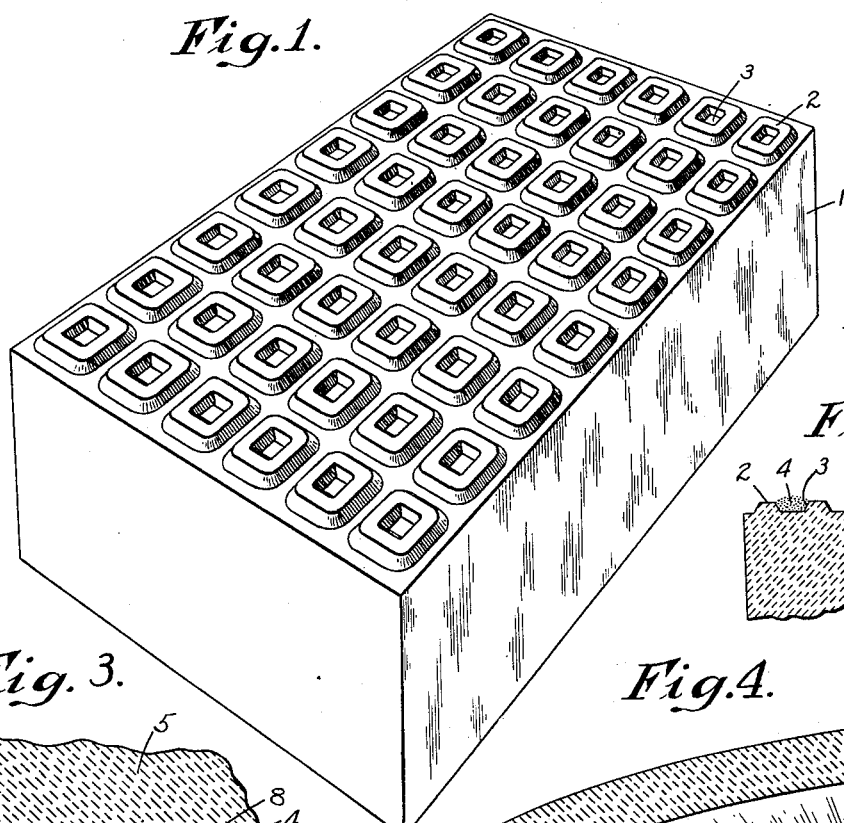
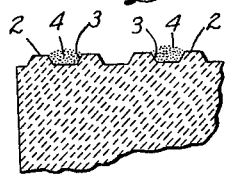
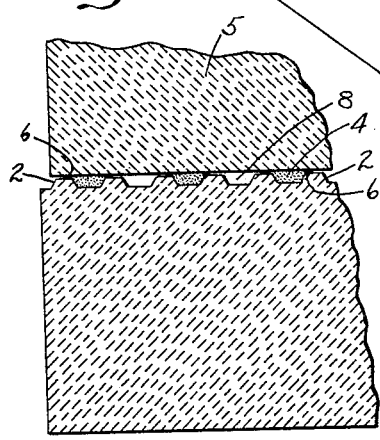
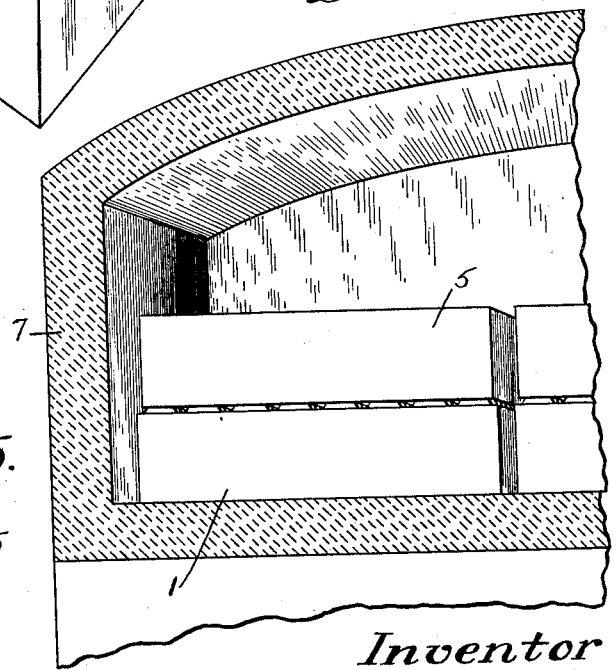
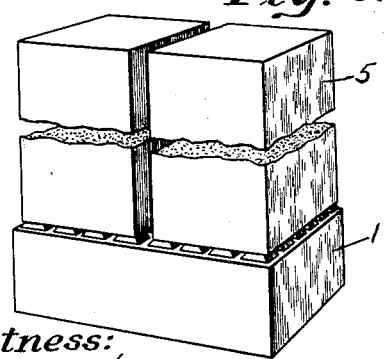
Inventor
Paul G. Willetts
by Brown & Parham
Attorneys.
Witness:
A. A. Horn Patented Jan. 3, 1933

1,893,314

UNITED STATES PATENT OFFICE

PAUL G. WILLETTS, OF WEST HARTFORD, CONNECTICUT, ASSIGNOR TO HARTFORD-EMPIRE COMPANY, OF HARTFORD, CONNECTICUT, A CORPORATION OF DELAWARE

MEANS FOR PRODUCING FIRED CERAMIC BLOCKS

Application filed September 20, 1929. Serial No. 393,929.

The present invention relates to methods of and means for manufacturing finished ceramic blocks and other objects, such as may be produced by the similar method of my prior Patent No. 1,626,260, granted April 26, 1927.

As is the case of the invention in the above-mentioned patent, the present invention is concerned with the problem of making refractory blocks, and other objects, which will possess the desired shape when the firing thereof is completed. Prior to the invention disclosed in said patent, difficulty was experienced in ceramically making refractory objects, such as tank blocks for glass furnaces, which would have the proper shape for immediate use, and would not require grinding or cutting after firing.

In my copending application for Letters Patent, filed March 1, 1926, Serial No. 91,361, it has been proposed to produce refractory objects by combining clays and other selected ingredients to form dense, homogeneous and fine grained material by chemical rearrangement effected by firing. Such material may consist of mullite and a small amount of vitreous slag. The firing temperature may exceed 3000° F. at or near which temperature the material begins to lose its rigidity to a very slight extent. In making refractory objects by this method, and by other methods, they are apt to shrink unevenly during the firing as a result of which, they must be ground to the desired shape or size, or discarded, which obviously is uneconomical. Such uneven shrinkage is especially manifest in tank blocks, and other rectangular objects, which frequently shrink more at the top than at the bottom. Such shrinkage may be due in part to the softening of the material; to the frictional resistance between the block and the material upon which it rests during firing; and to improper application of heat to, and distribution of heat in, the material forming the block. Improper heating of the block may cause the chemical rearrangement of the constituents of the material to take place at different stages in the shrinkage thereof.

It is an object of the present invention to provide a novel method of, and novel means for, overcoming the above and other difficulties whereby refractory objects of the desired shape and size may be produced in an economical manner. To this end, the method of my prior patent may be employed to a certain extent; that is, the blocks or other objects are prepared in the exact size and shape which they are to have after firing, due allowance being made for shrinkage, and are placed upon a pallet or support consisting of refractory material which will itself shrink at least as much as the objects themselves during firing. The blocks or other objects preferably are placed in one course only and the pallets or supports may consist of unburned grog mixture of the character disclosed in the above-mentioned patent, so that after firing, the pallets or supports may be broken up and used as grog or for other purposes.

In contradistinction to my patented method, however, instead of merely placing the objects to be fired directly upon the pallets or supports, or with only a comparatively thin interposed layer or granular refractory material scattered on the pallets or supports, the present invention contemplates supporting the blocks at a plurality of points, preferably equidistantly spaced, and in such manner that an appreciable space between the blocks and pallets also is provided. For this purpose, the tops of the pallets may have recessed "buttons" or projections formed thereon for holding small piles of powdered or granular refractory material of suitable character. The small heaps of refractory material not only prevent sticking of the blocks to the pallets, but eliminate any frictional resistance to uniform shrinkage which might be offered by the support, and also insure uniform application of heat to the blocks, particularly the bottom portions thereof.

In order that the invention may be readily understood and its manifold advantages appreciated, reference should be had to the accompanying drawing in which I have illustrated means for practicing my novel method.

In said drawing:

Figure 1 is a view perspective of a pallet or support embodying the invention;

Fig. 2 is a partial view in vertical cross section of the pallet shown in Fig. 1, and showing heaps of powdered material in the recesses of the "buttons";

Fig. 3 is a view similar to Fig. 2 but showing a portion of a block or other object supported upon the pallet for firing;

Fig. 4 is a view in perspective showing the manner of stacking blocks in a kiln for firing; and Fig. 5 is a view in perspective showing another method of stacking the blocks for firing.

Referring in detail to the drawing:

A pallet designated generally at 1 is shown having a plurality of projections or "buttons" 2 formed therein. The "buttons" have recesses 3 formed therein for holding heaps of powdered or granular refractory material 4 which are placed therein, as illustrated in Fig. 2. Said material may be same as that employed in my prior patent, previously referred to. The projections or "buttons" preferably are arranged in rows, as shown, and spaced equidistantly from each other, but as will be obvious, any other suitable arrangement thereof may be employed.

The pallet or support is molded in suitable manner and may for example, consist of unburned grog mixture of the character employed for the pallet or support in my prior patent, and disclosed in the above mentioned co-pending application. Hence, the blocks or objects, if made according to the disclosure of the same application may have a shrinkage of 5%, and the pallet or support 7½%, and after burning, the pallet may be broken up and used for grog. The pallets or supports and the blocks or objects may be made of the same material.

When a block 5, or other object is placed upon the pallet 1, as shown in Fig. 3, the heaps of powdered material 4 are flattened somewhat, portions thereof being spread laterally between the bottom of the block and the top of the projection as indicated at 6 in said Fig. 3, preventing the block or object from sticking to the projections or "buttons" 2.

The blocks 5 may be laid flat in one course on the pallets 1 in the kiln 7, as is clearly illustrated in Fig. 4; or the blocks may be stood on end as shown in Fig. 5, in which event a plurality of blocks may be supported by a single pallet. The presence of the projections or "buttons" 2 and the heaps of powdered material therein cause intersecting channels or passages 8 to be formed between the blocks and the pallets. The passages or channels 8 serve to conduct hot gases of combustion as a result of which a uniform application of heat to the bottoms of the blocks as well as a face of the pallet, is obtained.

During the firing of the blocks, the pallets will shrink at least as much as the blocks themselves. But in the event that differential shrinkage occurs between the blocks and the pallets, the blocks will be permitted to move by the heaps of powdered refractory material, which act substantially as frictionless bearings. By arranging the powdered refractory material in spaced piles, the total area of frictional contact between the blocks and the pallets is greatly reduced, and the uniform shrinkage of the blocks consequently facilitated.

Although the invention has been described in connection with the manufacture of blocks for glass furnaces, it is to be understood that it may be employed for producing other objects of refractory material, which tend to shrink unequally during firing, and that various changes may be made in the performance of the method and in the details of construction of the means for practicing the method, without departing from the scope of the appended claims.

Having thus described my invention, what I desire to claim and to secure by Letters Patent is:

1. Means for supporting a ceramic object during firing, comprising a block of refractory material, and means provided on one side of said block for holding a plurality of piles of granular or powdered refractory material.

2. Means for supporting a ceramic object during firing, comprising a block of unburned refractory material, and means on one side of said block for holding a plurality of piles of refractory material.

3. Means for supporting a refractory object during firing, comprising a block of refractory material, said block having a plurality of equidistantly spaced recesses for holding piles of granular or powdered refractory material.

4. Means for supporting a refractory object during firing, comprising a block of unburned refractory material, said block having a plurality of recesses for holding piles of granular or powdered refractory material.

5. Means for supporting a refractory object during firing, comprising a block of refractory material, a plurality of projections formed on said block, and recesses in said projections for granular or powdered refractory material.

6. Means for supporting a refractory object during firing, comprising a block of unburned refractory material, projections formed on said block and spaced equidistantly from each other, and recesses in said projections for granular or powdered refractory material.

7. A shrinking pallet for supporting refractory objects during firing, said pallet having a plurality of projections formed on one of its horizontal faces, whereby when said pallet is in use, the said projections form intersecting channels on the surface thereof for the passage of heat.

8. A shrinking pallet for supporting refractory objects during firing, said pallet having a plurality of projections formed integrally with one of its horizontal faces, whereby when said pallet is in use, the said projections provide intersecting channels on the surface of the block for the passage of heat.

Signed at Hartford, Connecticut this 18th day of September 1929.

PAUL G. WILLETTS.